United States Patent
Akarsu Dülgar et al.

(10) Patent No.: US 12,098,295 B2
(45) Date of Patent: Sep. 24, 2024

(54) POLYMODAL POLYMER COMPOSITIONS FOR COATING APPLICATIONS

(71) Applicant: ORGANIK KIMYA SANAYI VE TIC. A.S., Istanbul (AR)

(72) Inventors: Cansu Akarsu Dülgar, Istanbul (AR); Guillermo Perez Lorenzo, Istanbul (AR); Utkan Bahri Bakirci, Istanbul (AR); Fatma Arslan, Istanbul (AR)

(73) Assignee: ORGANIK KIMYA SANAYI VE TIC. A.S., Istanbul (TR)

( * ) Notice: Subject to any disclaimer, the term of this patent is extended or adjusted under 35 U.S.C. 154(b) by 856 days.

(21) Appl. No.: 17/274,313

(22) PCT Filed: Sep. 11, 2019

(86) PCT No.: PCT/TR2019/050746
§ 371 (c)(1),
(2) Date: Mar. 8, 2021

(87) PCT Pub. No.: WO2020/055371
PCT Pub. Date: Mar. 19, 2020

(65) Prior Publication Data
US 2021/0348015 A1    Nov. 11, 2021

(30) Foreign Application Priority Data
Sep. 11, 2018   (EP) ...................................... 18193906

(51) Int. Cl.
*C09D 153/00* (2006.01)
*C08F 293/00* (2006.01)
*C09D 5/02* (2006.01)

(52) U.S. Cl.
CPC .......... *C09D 153/00* (2013.01); *C08F 293/00* (2013.01); *C09D 5/022* (2013.01)

(58) Field of Classification Search
CPC ........ C08F 2/22; C08F 265/06; C08F 293/00; C08L 51/003; C09D 11/106; C09D 151/003; C09D 151/06; C09D 153/00; C09D 5/022; C09J 151/003
See application file for complete search history.

(56) References Cited

U.S. PATENT DOCUMENTS

| | | | |
|---|---|---|---|
| 4,567,099 A | 1/1986 | Van Gilder et al. | |
| 6,673,451 B2 | 1/2004 | Bardman et al. | |
| 6,992,121 B1 * | 1/2006 | Peters ................... | C08F 285/00 524/833 |
| 8,053,511 B2 | 11/2011 | Muller et al. | |
| 2009/0092677 A1 | 4/2009 | Richard | |
| 2010/0081764 A1 | 4/2010 | Ouzineb et al. | |
| 2015/0344746 A1 | 12/2015 | Ha et al. | |

FOREIGN PATENT DOCUMENTS

| | | |
|---|---|---|
| EP | 1344786 A2 | 9/2003 |
| EP | 1240223 B1 | 1/2004 |
| EP | 1498430 B1 | 9/2007 |
| EP | 1940901 B1 | 9/2014 |
| WO | 2001/38412 A1 | 5/2001 |
| WO | 2013/070478 A1 | 5/2013 |

OTHER PUBLICATIONS

International Search Report dated Apr. 17, 2020, for corresponding International Patent Application No. PCT/TR2019//050746.
Written Opinion dated Apr. 17, 2020, for corresponding International Patent Application No. PCT/TR2019//050746.
Akarsu D.C.; "Synthesis of poly(BA-co-MMA) dispersions having AA/MAA/AAmIMAAm comonomers and the comparison of their effect on adhesive performance". Polymer Bulletin, vol. 75, (2018).
International Search Report dated Apr. 12, 2018, for International Patent Application No. PCT/EP2018/055423.
Written Opinion dated Apr. 12, 2018, for International Patent Application No. PCT/EP2018/055423.
International Preliminary Report on Patentability dated Sep. 10, 2019, for International Patent Application No. PCT/EP2018/055423.

* cited by examiner

*Primary Examiner* — Ana L. Woodward
(74) *Attorney, Agent, or Firm* — Pergament & Cepeda LLC; Edward D. Pergament; Milagros A. Cepeda

(57) ABSTRACT

The present invention relates to a polymodal polymer composition having homogeneous as well as heterogeneous particles formed by radical emulsion polymerization of monomers from category A which forms homopolymers with Tg above 15° C. and monomers from category B which forms homopolymers with Tg below −15° C. The polymer composition is composed of at least two different populations of particles, differing in mean particle size value by at least a factor of 2. Thus, the two different populations of polymer particles in the polymer composition differ with respect to size and monomer composition of the particles.

15 Claims, No Drawings

POLYMODAL POLYMER COMPOSITIONS FOR COATING APPLICATIONS

This application is a National Stage Application under 35 U.S.C. § 371 of PCT International Application No. PCT/TR2019/050746, filed Sep. 11, 2019, which takes priority from European Provisional Application Number EP 18193906.7, filed Sep. 11, 2018, all of which are herein incorporated by reference in their entireties.

The present invention relates to a polymodal polymer composition having homogeneous as well as heterogeneous particles formed by radical emulsion polymerization of monomers from category A which forms homopolymers with Tg above 15° C. and monomers from category B which forms homopolymers with Tg below −15° C. The polymer composition comprises at least two different populations of particles, differing in mean particle size value by at least a factor of 2. Thus, the two different populations of polymer particles in the polymer composition differ with respect to size and monomer composition of the particles. The polymer composition with high solid content and low viscosity possesses itself or provides to the resultant coating formulation, excellent water resistance, wet scrub resistance, thickening response, hardness and blocking performance. The present invention also relates to a multistage process for producing said polymodal polymer composition having homogeneous as well as heterogeneous particles, formed by radical emulsion polymerization of monomers from category A which forms homopolymers with Tg above 15° C. and monomers from category B which forms homopolymers with Tg below −15° C. The polymodal polymer composition of the present invention is useful in a wide range of applications, including coating formulations such as paints, binders for nonwovens and textiles, ink formulations, leather and paper coating formulations, paper impregnation and adhesives.

Emulsion polymerization is a free-radical-initiated polymerization in which a monomer or a mixture of monomers is polymerized in the presence of an aqueous solution of a surfactant to form a product, known as a latex. The latex is described as a colloidal dispersion of polymer particles in an aqueous medium. The monomer, water, surfactants, initiators and chain transfer agents are the main ingredients of emulsion polymers. Emulsion polymerization is known to be a resource-and energy-saving, eco-friendly process for the production of polymer lattices. This process is basically a free-radical polymerization of monomers in aqueous medium; the final latex is stabilized by surfactants or protective colloids. This polymerization process was first commercialized in the early 1930s, and since then it has been widely used to produce environmentally friendly latex products with a variety of colloidal and physicochemical properties.

Water based polymer dispersions are conventionally produced by emulsion polymerization technique which is well known in the state of the art and they provide a variety of advantages over solvent based polymers by having ease of application, low manufacturing cost and including very low amounts of volatile organic compounds. They can be employed in a wide variety of applications and formulations. Emulsion polymerization mainly requires the following key ingredients: a monomer or a monomer mixture, a surfactant or a surfactant mixture, an initiator and water as the continuous phase. The monomer or monomer mixture is emulsified into the droplets with the aid of surfactant or surfactant mixture and high shear agitation. Typical monomers used to synthesize emulsion polymers include ethylene, styrene, butadiene, acrylonitrile, acrylate, methacrylate ester monomers, vinyl acetate, acrylic acid, methacrylic acid, vinyl chloride and etc., are suspended in water in which a surfactant has been added. Surfactants are used to support the polymerization reaction and enhance emulsion stability. Although their presence is essential during synthesis, they may have adverse effects on the polymer film's and coating film's long term performance. Further auxiliaries, such as chain transfer agents, buffers, acids, bases, biocides etc., may be used.

Since their introduction decades ago, acrylic polymers have gained a strong foothold in the coatings and allied industries as a result of their improved flexibility and adhesion compared to previous resins and polymer systems. In addition, their significantly improved outdoor durability, including resistance to ultraviolet degradation, has mandated their use in several applications. In many respects, the name "acrylic" has become synonymous with a high performance level in a polymer system. The major monomers used are ethyl acrylate, methyl methacrylate and butyl acrylate, as well as non-acrylic monomers such as vinyl acetate and styrene. Copolymers latexes of these monomers have wide range of application areas such as paint, coating, textile, leather, construction and etc. These polymers are stable, have good pigment binding capacity, durability, chemical resistance, impact resistance. Wide range of copolymers can be produced, and by varying the ratio of their monomers a series of polymers with a wide range of glass transition temperatures can be produced with emulsion polymerization method.

Polyacrylate dispersions are typically produced with solid contents between 50% to 70% and average particle sizes are typically between 100 nm to 1000 nm. In order to produce dispersions with high solid content (>60%) and low viscosity (<500 MPa) at the same time, the dispersions need to have a bimodal or polymodal particle size distribution. The means for forming polymers with bimodal or polymodal particle size distributions are well known in the art and include methods such as using different sized seeds, introducing seed polymers into the polymerization medium and changing the feed rate.

Aqueous polymer emulsions having a bimodal particle size or molecular weight distributions can be both produced by conventional emulsion polymerization or mini emulsion processes. Although conventional emulsion polymerization and mini-emulsion polymerization methods were successful in creating bimodal polymers, the peaks of particle size and molecular weight obtained by conventional emulsion and mini-emulsion processes were different and thus, it was not easy to distinguish between the effects of different particle size or molecular weight distribution on the properties of these polymers. However, the following difference of mini emulsion polymerization may result as an advantage in the process: Mini-emulsion polymerization differs from conventional emulsion polymerization in that the reaction proceeds under droplet nucleation conditions and not via micellar or homogeneous nucleation. A properly formulated mini-emulsion is able to reach a kinetically stable state in which the droplets with diameters on the order of 100 nm act as nano-reactors and diffusion of monomer through the aqueous phase could be minimized.

The synthesis of latex polymers with high solids content and low viscosity has gained great interest from both industry and academia. Highly concentrated emulsions with a solid content above 60% have numerous advantages including the higher unitary usage of industrial installations during production and the faster drying rates during application.

Low viscosity enhances the heat removal rate and agitation during the polymerization process, which results in improvements of safety, production capacity and product quality. Additionally, low viscosity of the aqueous emulsion polymers enable easier transfer of the polymer during and after the production and ease of use while prepaing coating formulations For a given solid content, the viscosity of latex decreases with the increase of average particle size.

Adsorption of anionic or cationic surfactants and incorporation of ionic groups into the polymer provides highly stable polymer dispersions. Nonionic type of stabilization takes place via hydrophilic groups on the particle surface by amino or hydroxyl-containing monomers or protective colloids. Industrially used polymer dispersions are usually stabilized by both mechanisms. The special nature of the particle surface, which differs from particle interior, plays an important role in all applications. Surface characteristics of particles are designed according to physical properties such as substrate roughness, surface energy, mechanical properties or the chemical composition of the surface. Good wettability of a surface is essential to provide good bonding which is related to the surface energy. Wetting is determined as the spreading and contact of a liquid (polymer emulsion) over a solid surface (substrate). If contact is sufficiently achieved between the two phases, a physical attraction from inter-molecular forces occurs and substrate wetting is achieved. Good wettability is also important for extender wetting in coating formulations.

The surface of particles dispersed in an aqueous phase is particularly important in coating applications as well as inner structure of particles for imparting several properties to polymer dispersions. Moreover, the heterogeneity of polymer particles without having distinct layers, without separate core or shell regions within themselves is also found to impart specific properties to coating formulations in which the aqueous polymer emulsions having heterogeneous particles are used. Thus, particles having heterogeneous monomer composition stemming from multiple heterogeneous polymer chains, without having distinct layers, separate core or shell regions within the particles, can be achieved by emulsion polymerization depending on various physical parameters in multiple polymerization stages in order to benefit from the different properties gained by the non-uniform, heterogeneous monomer compositions of the particles.

Particles with a heterogeneous structure in a dispersion having polymodal particle size distribution can enhance stability, pigment binding capacity, durability, chemical resistance, wet scrub resistance, thickening response, impact resistance, weatherability, UV stability, high transparency, yellowing resistance, ease of variation in toughness, hardness, blocking resistance and flexibility. wear-resistance, water-resistance, weather-resistance, stain-repellent, anti-radiation performance, tensile strength, impact strength and adhesive strength of aqueous polymer dispersions while improving their transparency significantly and reducing the minimum film forming temperature. Thus, properties arising from particles having a heterogeneous composition can be tuned up by adjusting the constituting materials of the polymer particles.

Coatings can be divided into 2 groups as decorative and protective coatings and these are used in a wide variety of applications ranging from the common uses such as coatings for buildings, furnitures, metal coatings, automobiles to less known applications such as removable coatings, paper coatings, coating for optical fibers and electronic components. In most of the coating applications, solution polymers are used as the binder component. However, since the beginning of 2000s, restrictions on the solvents and volatile organic compounds used in paints and coatings, have started to apply, due to awareness of the consumers and the regulations implemented by the legal authorities. This legal framework has started to expand in order to cover all the coatings applications. Therefore, currently the biggest challenge in coatings industry is to provide environmentally sustainable products without sacrificing the performance. As a result of these, the production of water based coatings has increased. The wide variety applications of protective and decorative coatings, more specifically are, wood coatings, interior and exterior wall coatings, fast drying traffic paints, leather coatings, architectural coatings, elastomeric wall or roof coatings, overcoat varnish, metal primer or coatings, woven or nonwoven coatings and flooring coatings. Coatings prepared with the aqueous polymer emulsion may be, based on the application, pigmented or clear coatings, satin coatings, gloss coatings, semi gloss coatings, textured coatings, flat coatings, primers and etc.

The aqueous polymer emulsions or the formulations based on them, may be applied to various substrates by conventional techniques such as spraying (air atomized spray, airless spray, air assisted spray, high volume low pressure spray) brushing, rolling, drawdown, flow coating, dipping, curtain coating and in printing applications when applying inks or overprint varnishes to a substrate by felox and gravure printing, roller coating, air knife coating and off set printing techniques. Suitable substrates to which aqueous polymer emulsions may be applied include, but are not limited to, medium density fiber board; chip boards, laminates; mineral substrates such as masonry, cement, fiber cement, cement asbestos, plaster, plaster board, glazed and unglazed ceramic; metal substrates such as galvanized iron, galvanized steel, cold rolled steel, aluminum, wrought iron, drop forged steel, and stainless steel; already painted or primed surfaces; cellulosic substrates such as paper and paperboard; glass; asphalt; leather; wallboard; nonwoven materials; and synthetic substrates such as polyvinyl chloride, polyvinylidene chloride, polyethylene, and polypropylene.

Acrylic polymer emulsions are formulated with urea or phenol formaldehyde resins and volatile organic compounds in order to obtain brittle paper coating materials. The formulation recipe is used to saturate the paper and coated paper is used in wood and furniture lamination industry.

Thus, coatings can be used in a wide variety of applications and consequently coating formulations may have a wide variety of properties. The properties of these coating formulations should be adjusted according to the intended application.

Water whitening is a very complex phenomenon and it can be defined as the discoloration that occurs due to exposure to water, of a polymer film having segregated surfactant domains. It is believed to be caused by the water molecules penetrating into the polymer film and accumulation of water inside these domains. The effect of temperature on the rate of this change is significant. At high temperatures the waterborne polymer emulsion turn white very rapidly.

To improve the water whitening performance, one should prevent either the segregation of ionic species and surfactant during film formation or seriously limit the swelling of the hydrophilic domains by absorbed water. Water whitening performance can be improved by decreasing the average particle size in low solid polymer dispersions. However, in high solid monomodal dispersions, the decrease of particle size would result in high viscosity and this is not desired due to the difficulties related to transfer and hardness in the applications of the polymer dispersions. Thus a high solid low viscosity (bimodal/polymodal) polymer should be produced. The double seeded polymerization process for the production of such a polymer is well known in the state of the art. Additionally the use of aqueous polymer emulsions having high solids and low viscosities is well known in the state of the art in numerous applications such as coatings and as binders in coating formulations.

In WO 2013/070478 A1, a bimodal toughening agent is disclosed wherein the bimodal toughening agent comprises a) a first and b) a second preformed core-shell toughening agents. The particle size of the second toughening agent is twice as much of the first toughening agent and the bimodal toughening agent is used in a thermosettable epoxy resin composition. It is also disclosed that fracture toughness is improved due to a synergy resulting from using a bimodal particle size distribution of preformed core-shell type toughening agents. The particles have a core-shell morphology with distinct regions and, the technical effect resulting from said synergy is directed to fracture toughness. Additionally, said agents forming the composition are preformed, meaning that first and second toughening agents are produced by different processes, causing extra operations.

In EP 1 498 430 B1, a process is disclosed for preparing an aqueous polymer dispersion containing at least two different modes of polymer particles which differ by at least one attribute such as particle diameter, molecular weight, composition, glass transition temperature or morphology. The different formulations in many applications are said to be prepared in order to optimize desired properties and many different combinations are mentioned. The polymerization for preparing the polymer dispersion occurs in an aqueous medium in the presence of polymerization blockers which could affect performance of the end product by causing impurities. Besides, even if they are used in small amounts, they increase the costs of the product. Additionally, since it prevents the reaction, the timing of the addition is crucial and this increases the number of steps in the process.

EP 1 240 223 B1 discloses a polymodal multistage polymeric material which can provide very high solid content while having low viscosity and exhibit improved properties such as drying rates, film formation and blocking resistance. Said polymeric material comprises i) polymers of at least two polymerization stages having a Tg difference of 20° C. to 60° C. and ii) polymers of at least two polymerization stages having a particle size differing by 50 nm to 100 nm. The means to form at least one of the differing Tg's in i) and at least one of the differing particle sizes (Dw's) in ii) are carried out in different stages of the multistage polymerization to form the polymeric material. At the end, a polymeric material having large and small particles exhibits said properties, where they also differ in being hard or soft determined by the Tg of the polymers.

In EP 1 940 901 B1, an impact modified acrylic based composition having a bimodal distribution of impact modifier particle sizes is disclosed. Here, the bimodal particle size distribution is used not for achieving higher solids in a polymer emulsion, but for optimizing the desired properties of impact modifiers. It has been mentioned that an acrylic composition having small and large particle size impact modifiers exhibit both good impact performance and appearance after melt processing. Core-shell multilayer polymers are also disclosed as preferred impact modifiers. However, combined with a bimodal particle size distribution their technical effect is limited with optimizing impact performance and appearance of impact modifiers.

EP 1 344 786 A2 discloses a polymer composition useful for preparing coatings for metal substrates having improved solvent resistance. It is disclosed therein that these polymers may have bimodal particle size distribution. It is also said that these polymers may have core-shell morphologies. Additionally, according to one embodiment of the disclosure, the copolymers having aldehyde reactive group containing monomer as copolymerized units are useful for preparing dry coatings having improved adhesion to substrates. The improved adhesion is due to aldehyde reactive groups of the copolymer particles.

In US 2010/0081764 A1, an aqueous dispersion of heterogeneous polymer particles produced by mini emulsion polymerization is disclosed. It is also disclosed that a bimodal molecular weight distribution can be obtained during synthesis wherein low molecular weight particles contribute to an improved level of adhesion and higher molecular weight particles ensure a good level of cohesion. The "heterogeneous polymer particle" term in this disclosure is used interchangeably with a core shell particle morphology which has distinct layers having differing Tg's.

In AU 4 658 085 A, a similar use of the term "heterogeneous particles" is disclosed: a bimodal polymer latex comprising two separate and distinct particle size distributions of large and small size particles wherein the large size particles comprise particles which are heterogeneous in nature having a soft polymer domain and a hard polymer domain. The heterogeneous nature of the large size particles provides a desirable gloss and a binding characteristic to the coating formulation as stated therein.

U.S. Pat. No. 6,673,451 discloses an aqueous multimodal polymeric dispersion wherein at least one mode of polymer particles includes a core and at least two shells with differing Tg's and contains at least one void. According to said document, a bimodal emulsion polymer particle size distribution with at least one of particle populations containing voids permits improvements in paper and paperboard coating compositions and is suitable for forming paint compositions.

In U.S. Pat. No. 8,053,511, dispersions to be used in a wide variety of applications including adhesives are disclosed. These dispersions can be copolymers having a homogeneous or heterogeneous particle morphology. However, no specific reference has been found regarding the effect of particle morphology.

In US 2009/0092677 A1, compositions containing injectable particles having at least two polymeric components that differ in composition from one another are disclosed. These particles are mentioned as heterogeneous with regions that are chemically different from each other. Even though bimodal delivery profiles are also mentioned in some of the embodiments, the disclosure is in a totally different technical field.

In many coating applications it is desirable for the aqueous polymer emulsion (by itself or in the coating formulation), to possess or provide to the resultant coating, a combination of various properties such as, very high polymer solids content in the emulsion since this results in fast drying to form the polymeric film coating.
low viscosity for ease of application when using standard coating techniques,
good blocking performance,
good water resistance
good thickening response,
good hardness, Thus, an object of the present invention is to provide a non-water whitening polymer composition having high solid content and low viscosity which possesses or provides to the resultant coating a combination of improved blocking performance, water resistance, thickening response and hardness.

The problem to be solved is to provide an aqueous polymer emulsion which shall possess such properties by itself or provide to the resultant coating formulation. This object is solved by the embodiments characterized in the claims.

Accordingly, in an embodiment of the present invention there is disclosed a polymodal polymer composition formed by radical emulsion polymerization of monomers from category A which forms homopolymers with Tg above 15° C. and monomers from category B which forms homopolymers with Tg below −15° C., characterized in that the polymodal polymer composition is composed of at least two different populations of particles, said populations differing in mean particle size value by at least a factor of 2, wherein said two different populations jointly constitute at least 80% by weight of the total polymeric content within said composition and the Tg difference between the two populations being less than 20° C., wherein
  (a) a population $P_2$ is constituted by at least 80% by weight of homogeneous particles containing polymer chains built of monomers $A_2$ and $B_2$, wherein the combined content of said monomers $A_2$ and $B_2$ in these polymer chains is at least 80% by weight, and
  (b) a population $P_1$, distinctive of $P_2$ by mean particle size value and monomer composition, of which the particles are constituted of polymer chains predominantly built of monomers $A_1$ $B_1$ and $A_2$, $B_2$,
    said population $P_1$ being constituted by at least 80% by weight of monomers selected from categories A and B, wherein category A and category B monomers are not randomly co-polymerized, but in a sequential process whereby monomers $A_2$ and $B_2$ are polymerized after the monomers $A_1$ and $B_1$, inducing compositional heterogeneity in those polymeric chains constituting the particles of said population, but where at least one of the monomers from the same category (either A or B) forming $P_1$ and $P_2$ are different from each other.

In an embodiment, the amount of monomers in the polymodal polymer composition from categories A and B are at least 80% by weight of the total amount of monomers present in the composition, and the ratio of monomers in category A to category B is comprised from 20% to 80%, hence the ratio of monomers in category B to category A is comprised from 80% to 20%, based on the combined weight of monomers A and B.

In a preferred embodiment, the total amount of monomers in the polymodal polymer composition from categories A and B are 90% by weight of the total monomer amount and the ratio of the amount of monomers in category A to category B is 20% to 80% by weight or the ratio of the amount of monomers in category B to category A is 20% to 80% by weight.

In another preferred embodiment, the polymodal polymer composition further comprises (c) up to 15% of other monomers which can also be selected from categories A and B, up to 5% of functional monomers containing carboxylic, sulfonic or phosphoric acid functionality, poly-unsaturated monomers, epoxy, hydroxy, amino, amido, di-carbonyl, and siloxane, and up to 5% of surface-active components, including anionic and non-ionic surfactants, water-soluble colloids and polyelectrolytes capable of stabilizing polymer particles in the aqueous medium.

The resulting polymer composition is a polymer dispersion with high solid content and low viscosity possessing itself or providing a combination of improved blocking performance, water resistance, thickening response, hardness to the resultant coating formulation. Also when used as a binder for paper impregnation water resistance is improved.

A synergistic effect is given by a specific combination of different polymer particles populations ($P_1$, $P_2$), wherein these populations contain particles having different monomer combinations and include a population of larger particles (population $P_1$) with a heterogeneous monomer combination, in order to achieve a better performance in one or more specific properties of such aqueous polymer composition.

According to the present invention, the performance of these low viscosity (polymodal) polymers is found to improve when a population of larger particles (population $P_1$) in the dispersion have a heterogeneous monomer combination.

The polymodal polymer composition with homogeneous as well as heterogeneous particles according to the present invention can be produced by a multistage radical emulsion polymerization. Thus, another embodiment of the present invention relates to a process for producing the polymer composition according to the present invention, which comprises the steps of:

separately providing a seed polymer having an average particle size of 20 nm to 200, providing a first monomer emulsion comprising monomers A1 and $B_1$, and providing a second monomer emulsion comprising monomers A2 and B2, respectively, polymerizing the first monomer emulsion by radical emulsion polymerization in an aqueous polymerization medium containing a first seed polymer;
  adding a second seed polymer and the second monomer emulsion to the polymerization medium; and
  polymerizing the second monomer emulsion in the presence of the first made polymer, and the second seed polymer as to produce particles of populations $P_1$ and $P_2$.

In the state of the art, the terms "core-shell morphology", "core-shell structure", "core-shell particles", "core-shell composition", "multilayered particles", "heterogeneous particles" are generally used interchangeably and mean a polymer particle of which the structure and/or chemical composition (e.g., monomer composition and/or amount) changes from the center to the surface of the particle and, as a result, these disparate zones can have different physical and chemical properties. These polymers are produced by seeded multistage emulsion polymerization method and by feeding different kinds of monomer emulsion compositions into the polymerization medium, in different stages of the polymerization process. The structure of these multilayered polymers constitutes the chemical and/or physical bonding and/or attraction between the polymer(s) forming the core portion (inner layer) and the polymer(s) forming the shell portion (outer layer). Accordingly, the terms "core" and "shell" refer to the polymeric content of the inside and the outside of the particle, respectively. For most of the time using said terms should not be construed as meaning that the polymer particles will exhibit precisely a distinct interface at a determined position along the gradient from the center to the surface of the particle or between the polymers of the core and the shell of the particle. However, in theory this is exactly what is targeted although there might be some deviations from the theory in experimental results. So, the polymer structure or composition of these core-shell particles may be changing along any radius of the particle without having a distinct interface. In most of the preferred embodiments in the state of the art, the difference in the structure and composition of the core and the shell may be characterized in such a way, the transition from the core to the shell may be determined in a range along the radius.

As used herein and throughout the specification the term "heterogeneous particle(s)" does not refer at all to core-shell or multilayered particles. There are two main population of particles in the polymodal polymer composition according to the present invention:
  i) The polymer chains constituting the particles of the population with the smaller particle size ($P_2$) are essentially homogeneous in monomer combination. Homogeneous monomer composition means that the polymer chains within these particles have the same monomer ratios and those monomers are distributed in the same way throughout the polymer chains, with minor, unintended differences attributable to the radical emulsion polymerization process itself.
  ii) The polymer chains constituting the particles of the population with the larger particle size (Pi) are not homogeneous in monomer combination. There will be polymer chains in which one domain in the polymer chain is composed of the monomer combination of a first step of polymerization, whereas another domain in the same chain is constituted by the monomer combination of a second polymerization step. There will also be, within the same large particles, polymer chains constituted only by the monomer combination of the first step as well as polymer chains constituted by the monomer combination of a second or a third step. This is achieved by using different monomer combinations coming from different monomer categories A and B, at different steps in the polymerization process, wherein the Tg value of the homopolymers formed by the monomers in category A is above 15° C. and the Tg value of the homopolymers formed by the monomers in category B is below −15° C. Since the difference in Tg and hydrophobicity of the different monomer combinations used at the different polymerization steps are small, distinct interphases or regions in the particles will not be formed. Therefore, the particles having a heterogeneous monomer combination throughout the polymer chains, are called as heterogeneous particles throughout the specification in order to differentiate from multilayer or core shell particles which have distinct interphases or regions within themselves due to Tg and/or significant hydrophobicity differences.

Thus, the term "heterogeneous particle" as used herein and throughout the specification refers to a particle with a non-uniform monomer combination without a distinct interface, separate layers or regions along a radius from the center to the surface of the particle. When in any of the polymerization steps small amounts (typically less than 5% based on the total monomer amount in that polymerization step) of a pre-polymer (seed polymer or pre-form) is used, that seed is not taken into account for the above given definitions.

As used herein and throughout the specification the term "polymodal" means that there are two or more different populations of particles in the composition/dispersion and the particles in each population, discriminated according to mass fractions, differ from the other population with respect to particle sizes.

The polymodal polymer composition with homogeneous as well as heterogeneous particles according to the present invention is especially useful as low viscosity aqueous polymer emulsion having high solid content in coating formulations, in which excellent blocking, water resistance, thickening response, hardness are required in order to withstand tough conditions, excessive moisture and other challenges. The polymodal polymer compositions are especially used in several applications such as coatings, paints, papers, nonwovens, textiles, inks, saturants and etc.

As mentioned above, the present invention is based on the specific combination of populations of large and small polymer particles wherein these populations contain particles having different monomer compositions. The population of larger particles has a heterogeneous monomer composition, in order to achieve a better performance in one or more specific properties of the aqueous polymer emulsion composition described above. As used herein and throughout the specification "large population" or "large(r) particles" refer to particles having an average particle size of over 250 nm. The average particle size is determined by using laser diffraction, particularly by using the device Zetasizer Nanoseries Zen 1600 model. "Small particles", "small population", "fine particles" or "fine population" refer to particles having an average particle size of below 250 nm.

The polymodal polymer composition with homogeneous as well as heterogeneous particles according to the present invention can be produced by using delayed addition radical emulsion polymerization. The term "seed polymer" as used herein refers to an aqueous polymer dispersion having finely divided particles. It can be prepared by emulsion polymerization method. The average particle size of the seed polymer particles is typically between 10 nm to 100 nm, preferably 25 nm to 75 nm. The average particle sizes of the seed polymer may be up to 150 nm or even up to 200 nm. In different embodiments of the present invention seed polymers having different average particle sizes may be used in order to obtain the resulting particle size distribution of the polymodal polymer composition. In particular embodiments of the present invention, in the same process seed polymers having different average particle sizes, may also be used. The particle size of the seed is very important for controlling the particle size distribution of the resulting polymodal polymer composition. The resulting seed polymer is firstly used in the initiation step of the polymerization.

Prior to polymerization, the monomer emulsions should be prepared in two separate vessels equipped with an agitator. Two separate vessels are required since the second monomer emulsion composition, which is different from the first monomer emulsion, should be ready to be added to the first monomer emulsion. Apart from deionized water, surfactants are commonly used in both of the vessels. The water/surfactant mixture can be agitated with high shear agitator. For preparing the monomer emulsion compositions, the monomers are slowly added into the water/surfactant mixture under sufficient stirring for making a monomer pre-emulsion.

In the preparation of the first monomer emulsion, monomers are selected from category A. The list of monomers of category A comprises monomers which form homopolymers with Tg above 15° C. Some of the preferred monomers in this list are butyl methacrylate (BMA), vinyl acetate (VAM), styrene (Sty) acrylonitrile (AN), methyl methacrylate (MMA), glycidyl methacrylate (GlyMA), hydroxyethlymethacrylate (HEMA), acrylamide (AM), methacrylamide (MAM) and isobornyl (meth)acrylate (IBMA). The $A_1$ and $A_2$ monomers selected from the list of monomers of category A are more preferably butyl methacrylate (BMA), vinyl acetate (VAM), styrene (Sty) acrylonitrile (AN), and/or methyl methacrylate (MMA). Methyl methacrylate and styrene are the most preferred monomers to be selected from category A for Al and $A_2$ monomers.

The list of monomers of category B comprises monomers which form homopolymers with Tg below −15° C. Some of the preferable monomers in this list are 2-ethylhexyl acrylate (2-EHA), butyl acrylate (BA), ethyl acrylate (EA), octyl acrylate (OA), lauryl (meth)acrylate (LA), iso-butyl acrylate (i-BA), 2-hydroxyethyl acrylate (HEA). The $B_1$ and $B_2$ monomers selected from the list of monomers of category B are most preferably butyl acrylate (BA), ethyl acrylate (EA) and 2-ethylhexyl acrylate (2-EHA).

After completing all the additions, agitation should continue under sufficient rate until the resulting monomer emulsion is homogeneous and its appearance turns viscous and milky.

Starting and delayed initiators are prepared by dissolving in water in proper vessels before starting the polymerization reaction. Catalysts well known in the prior art can be used as the initiator.

Delayed radical emulsion polymerization and seeded polymerization methods can be used for the initiation step of the polymerization process. The mere role of the surfactant in this system is simply to avoid coagulation by maintaining the stability of the polymer particles. Deionized water is used throughout the whole polymerization process. In order to produce the polymer composition having a polymodal particle size distribution comprising heterogeneous particles, a multistage process is employed. Preferably, seed polymerization is used. Before the first stage, the seed polymer is produced by emulsion polymerization. The particle size of the seed polymer is important but its monomer composition is not relevant for the purpose of the invention. The role of the seed is to produce the intended particle size distributions. At the beginning of the process, the seed polymer 1, starting initiator solution and water are initially charged into the reactor. After that, the first monomer emulsion (Emulsion 1) and approximately half of the delayed initiator solution are fed in parallel into the reactor. Following the end of the first feed, seed polymer 2 is added into the reactor. Seed polymer 1 and seed polymer 2 can be same or different with each other with respect to amount, particle size and/or monomer composition. The second feed starts with the parallel flow of the second monomer emulsion (Emulsion 2) and the remaining delayed initiator solution. After the end of the polymerization reaction, it is possible that redox reactions may be applied to reduce any residual unreacted monomer. A redox post polymerization step provides lower residual monomer levels and/or lower volatile organic compound levels for emulsion systems. Catalysts and activators well known in the prior art can be used in the redox polymerization step.

The addition of the seed polymers 1 and 2 into the polymerization medium in particular steps of the process enables the formation of particles having different particle sizes. Likewise, the flow of monomer emulsions with different compositions enables the particles to have different monomer compositions.

The water-based, polymodal polymer composition obtained by said process preferably comprises 30 to about 70 weight percent, more preferably 40 or higher percent of a solid phase. Particularly, the solid phase is 60 to 70 weight percent. The solid phase in total—without differentiating between the different sized particles and their different monomer compositions—is the reaction product of:

i) from 20% to 80% by weight of monomers selected from category B, such as 2-ethylhexyl acrylate (2EHA), butyl acrylate (BA), ethyl acrylate (EA), octyl acrylate (OA), lauryl acrylate (LA), iso-butyl acrylate (i-BA), 2-hydroxyethyl acrylate (HEA), iso-Decyl Methacrylate(IDMA) and mixtures thereof, calculated on the combined amount of monomers A+B.

ii) From 80% to 20% by weight of monomers selected from category A, such as butyl methacrylate (BMA), vinyl acetate (VAM), styrene (Sty) acrylonitrile (AN), methyl methacrylate(MMA), glycidyl methacrylate (GlyMA), hydroxyethlymethacrylate (HEMA), acrylamide (AM), methacrylamide (MAM) and iso-butyl methacrylate (i-BMA) and mixtures thereof, calculated on the combined amount of monomers A+B iii) from 0,1% to 5% by weight of functional monomers containing carboxylic, sulfonic or phosphoric acid functionality copolymerizable with said A and B monomer(s) such as acrylic acid, methacrylic acid, itaconic acid, AMPS, SVS, Crotonic Acid, poly-unsaturated monomers, epoxy, hydroxy, amino, amido, di-carbonyl, and siloxane, and mixtures thereof; calculated on the combined amount of monomers A+B.

iv) up to 15% by weight of monomers selected from the group comprising vinyl esters—including vinyl acetate, vinyl propionate, vinyl butyrate, and the like, C1 to C4 esters of (meth)acrylic acid-including methyl methacrylate, methyl acrylate, ethyl acrylate, ethyl methacrylate, isobutyl methacrylate, styrene and the like, acrylic acid ester monomers of C2 to C16 alcohols and mixtures thereof, preferably including n-butyl acrylate, isobutyl acrylate, n-pentyl acrylate, n-hexyl acrylate, 2-ethylhexyl acrylate, isononyl acrylate, decyl acrylate and the like and also possibly from the list of monomers of categories A and/or B, v) about 0.01 to about 1% by weight of an initiator capable of starting free radical polymerization of the above monomers, such as peroxides (potassium persulfate, ammonium persulfate, sodium persulfate, hydrogen peroxide, terbutyl hydroxyperoxide), and substituted azonitril compounds (vazo initiators) and mixtures thereof; those can also be combined with reducing agents like sodium sulphite, Sodium metabisulphite, i-ascorbic acid, sulphoxilates (like rongalithe, bruggolithe), again calculated on the combined amount of monomers A+B, vi) from 0.1 to 5% by weight of emulsifiers and water- or-alkali soluble polymeric substances, known in the art to contribute to stabilize a dispersion in water such as anionic, cationic or nonionic surfactants selected from the group comprising alkyl sulfates alkyl sulfosuccinates, alkyl aryl sulfonates, α-olefin sulphonates, alkyl phosphate esters, quaternary ammonium salts, amine salts, fatty or resin acid salts, and derivatives of ethylene and propylene oxide, calculated on the combined amount of monomers A+B vii) about 0 to 3 percent by weight of a chain transfer agent; calculated on the combined amount of monomers A+B (viii) optionally from 0 to 5 percent by weight of a crosslinking agent; such as poly-unsaturated monomer like divynilbenzene(DVB), allyl Methacrylate and the like calculated on the combined amount of monomers A+B According to a preferred embodiment of the present invention, the total amount of monomers from categories A and B are 80% by weight of the total monomer amount and the ratio of monomers from category A to category B is 20% to 80% by weight or the ratio of monomers from category B to category A is 20% to 80% by weight.

According to another preferred embodiment of the present invention, $B_1$ and $B_2$ monomers selected from the monomer list of category B are the same monomers wherein $A_1$ and $A_2$ monomers selected from the list of category A monomers are different.

According to another preferred embodiment of the present invention, $A_1$ and $A_2$ monomers selected from the monomer list of category A are the same monomers wherein $B_1$ and $B_2$ monomers selected from the list of category B monomers are different.

Therefore, according to the present invention, $A_1$ and $A_2$ monomers may be the same type of monomers as shown in the above preferred embodiments. $B_1$ and $B_2$ monomers, may be the same type of monomers as well, as shown in the above preferred embodiments. However, according to the present invention when $A_1$ and $A_2$ are the same, $B_1$ and $B_2$ must be different. Similarly when $B_1$ and $B_2$ are the same $A_1$ and $A_2$ must be different. It is not part of the present invention to have, $A_1$ and $A_2$ being same monomers with each other at the same time with having $B_1$ and $B_2$ being same monomers with each other.

According to a preferred embodiment of the present invention, monomer $A_1$ is methyl methacrylate (MMA) and when $A_2$ is not the same as $A_1$, it is styrene (Sty).

According to a preferred embodiment of the present invention monomer $B_1$ is butyl acrylate and when $B_2$ is not the same as $B_1$, it is ethyl acrylate (EA) or 2-ethylhexyl acrylate (2-EHA).

As mentioned above, the polymodal polymer composition according to the present invention is composed of at least two different populations $P_1$ and $P_2$, wherein said two different populations jointly constitute at least 80% by weight of the total polymeric content within the polymer composition.

The sum of populations $P_1$ and $P_2$ preferably constitutes over 90% by weight, more preferably over 95% by weight, even more preferably 100% by weight, of the total polymeric content of the polymer.

In a preferred embodiment of the present invention, the population with larger particles can constitute over 70 weight percent of the solid phase having an average particle size of 250 to 750 nm wherein the remaining 30 weight percent of population of small particles are 50 to 200 nm.

In another preferred embodiment of the present invention, the population with larger particles may constitute 75 weight percent of the solid phase having an average particle size of 250 to 750 nm wherein the remaining 25 weight percent of population of small particles are 50 to 200 nm.

In another preferred embodiment of the present invention, the population with larger particles may constitute 60 weight percent of the solid phase having an average particle size of 250 to 750 nm wherein the remaining 40 weight percent of population of small particles are 50 to 200 nm.

The present invention will be further illustrated in the following reference examples and inventive examples without any limitation thereto.

EXAMPLES

The different exemplary embodiments are summarized and explained in detail below. Examples 5 is in accordance with the present invention.

Comparative Example 1

Seed addition (for bimodal particle size distribution) method has been used but the monomer composition only includes the below given Emulsion 5.1 structure.

Comparative Example 2

Seed addition method to obtain a bimodal particle size distribution has been used but only one monomer composition is prepared in a single emulsion vessel comprising all the monomers of Emulsion 5.1 and Emulsion 5.2 with the same amounts in total.

Comparative Example 3

Seed addition method has not been used, monomodal structure with same monomer composition as in Reference Example 5.

Comparative Example 4

Seed addition (bimodal particle size distribution) method has been used but the monomer composition only includes the below given Emulsion 5.2 structure.

Example 5

Inventive embodiment for a bimodal polymer composition having heterogeneous particles.

Comparative Example 1

Preparation of Monomer Emulsions

For the preparation of Emulsion 1.1, 21.4 g of surfactant A* and 12 g of surfactant B** were dissolved in 162 g deionized water and added to an emulsion vessel equipped with a stirrer. 400 g 2-ethyl hexyl acrylate, 360 g methyl methacrylate and 12.4 g of acrylic acid monomers were added into the same vessel, respectively.

*Surfactant A is fatty alcohol ether sulphate, sodium salt degree of ethoxylation about 30.

**Surfactant B is disodium ethoxylated alcohol (C10-12) half ester of sulfosuccinic acid.

The water-surfactant mixture was placed under high shear agitation at 200 rpm in the vessel. The monomers were slowly added into the water-surfactant mixture under sufficient stirring to make a monomer pre-emulsion. The required mixing time was 10 minutes for all the trials. The resulting monomer emulsions were homogenous, viscous and milky in appearance.

Preparation of Starting and Delayed Initiator

The starting initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed had a particle size around 50 nm and has been used in the initiation step of the polymerization in order to control the particle size distribution. For the polymerization procedure 11 g of 50 nm seed dispersion with a 33% of solid (seed polymer) content, the starting initiator, and water were initially charged into the reactor. The monomer emulsion (Emulsion 1.1) and the delayed initiator were fed parallel in two streams both having the same feeding time of 3 hours, using a peristaltic pump via silicone tubing. The feed rate was monitored volumetrically. The reactions were performed in a 1 liter, round-bottomed reactor glass flask with a mechanical agitator and stirred at 180 rpm. The reactor flask was equipped with a reflux condenser, thermocouple and metallic stirrer. Polymerization temperature was maintained at 84-86° C., and agitation rate was increased when necessary. After 50% of the emulsion feeding, 34.5 g of 50 nm seed dispersion with a 33% of solid (seed polymer) content was added into the reactor for the formation of small particles. After the end of the feed, the monomer mix beaker was flushed with water and post-heated for 30 min. The reaction mixture was then cooled down to 55° C. and post redox reaction was done. A redox post polymerization process provides lower residual monomer levels and/or lower volatile organic compound levels for emulsion systems. As the redox couple t-butyl hydroperoxide and sodium salt of an organic sulfonic acid derivative were selected. In a neutralization step, ammonia solution (28%) was used to adjust the pH to approximately 7.0±0.5. Then, the polymer was filtered into a suitable container.

Comparative Example 2

Preparation of Monomer Emulsions

For the preparation of Emulsion 2.1, 21.4 g surfactant A* and 12 g surfactant B** were dissolved in 162 g deionized water and added to an emulsion vessel equipped with a stirrer. 230 g of butyl acrylate and 12.4 g of acrylic acid, 200 g of 2-ethylhexyl acrylate, 150 g of styrene, 180 g methyl methacrylate were added into the same vessel, respectively.

The water-surfactant mixture was placed under high shear agitation at 200 rpm in the vessel. The monomers were slowly added into the water-surfactant mixture under sufficient stirring to make a monomer pre-emulsion. The required mixing time was 10 minutes for all the trials. The resulting monomer emulsions were homogenous, viscous and milky in appearance.

*Surfactant A is fatty alcohol ether sulphate, sodium salt degree of ethoxylation about 30.

**Surfactant B is disodium ethoxylated alcohol (C10-12) half ester of sulfosuccinic acid.

Preparation of Starting and Delayed Initiator

The initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed polymer had particle size of around 50 nm and had been used in the initiation step of the polymerization in order to control the particle size distribution. For the polymerization procedure 11 g of 50 nm seed dispersion with a 33% of solid (seed polymer) content, the starting initiator and water were initially charged into the reactor. The monomer emulsion (Emulsion 2.1) and the delayed initiator were fed parallel in two streams both having the same feeding time of 3 hours, using a peristaltic pump via silicone tubing. The feed rate was monitored volumetrically. The reactions were performed in a 1 liter, glass made and round-bottomed reactor flask with a mechanical agitator and stirred at 180 rpm. The reactor flask was equipped with reflux condenser, thermocouple and metallic stirrer.

Polymerization temperature was maintained at 84-86° C., and agitation rate was increased if necessary. After 50% of the emulsion feeding, 34.5 g of about 50 nm seed dispersion with a 33% of solid (seed polymer) content was added into the reactor for the formation of small particles. After the end of the feed, the monomer mix beaker was flushed with water and was post-heated for 30 min. The reaction mixture was then cooled down to 55° C. and post redox reaction was applied. A redox post polymerization process provides lower residual monomer levels and/or lower volatile organic compound levels for emulsion systems. As the redox couple t-butyl hydroperoxide/sodium salt of an organic sulfonic acid derivative were selected. In a neutralization step, ammonia solution (28%) was used to adjust the pH to approximately 7.0±0.5. Then, the polymer was filtered into a suitable container.

Comparative Example 3

Emulsion 3.1:10.7 g surfactant A* and 6 g surfactant B** were dissolved in 81 g deionized water and added in a vessel equipped with a stirrer. 200 g 2-ethylhexyl acrylate, 180 g methyl methacrylate and 6.2 g of acrylic acid were added into the same vessel, respectively.

Emulsion 3.2:10.7 g surfactant A* and 6 g surfactant B** were dissolved in 75.6 g deionized water and added in a vessel equipped with a stirrer. 230 g 2butyl acrylate, 6.2 g of acrylic acid, 150 g styrene were added into the same vessel, respectively. The only difference in this example was making the polymerization reaction without a seed polymer addition in the first or in any other stage of the polymerization process. The resulting polymer had a monomodal particle size distribution, although the same monomer composition as in Reference Example 5 had been used.

*Surfactant A is fatty alcohol ether sulphate, sodium salt degree of ethoxylation about 30.

**Surfactant B is disodium ethoxylated alcohol (C10-12) half ester of sulfosuccinic acid.

Comparative Example 4

Same as in Comparative Example 1 but the monomer composition of Emulsion 4.1 is 1.0 different than Emulsion 1.1.

Emulsion 4.1:21.4 g surfactant A* and 12 g surfactant B** were dissolved in 81 g deionized water and added in a vessel equipped with a stirrer. 300 g styrene, 12.4 g of acrylic acid, and 400 g butyl acrylate were added into the same vessel, respectively.

*Surfactant A is fatty alcohol ether sulphate, sodium salt degree of ethoxylation about 30.

**Surfactant B is disodium ethoxylated alcohol (C10-12) half ester of sulfosuccinic acid.

Example 5

Preparation of Monomer Emulsions

Emulsion 5.1:10.7 g surfactant A* and 6 g surfactant B** were dissolved in 81 g deionized water and added in a vessel equipped with a stirrer. 200 g 2-ethylhexyl acrylate, 180 g methyl methacrylate and 6.2 g of acrylic acid were added into the same vessel, respectively.

Emulsion 5.2:10.7 g surfactant A* and 6 g surfactant B** were dissolved in 75.6 g deionized water and added in a vessel equipped with a stirrer. 230 g butyl acrylate, 6.2 g of acrylic acid, 150 g styrene were added into the same vessel, respectively.

The water-surfactant mixture was placed under high shear agitation at 200 rpm. The monomer mixtures were slowly added into the water/surfactant mixture under sufficient stirring to make a monomer pre-emulsion. The required mixing time was 10 minutes for all the trials. The resulting monomer emulsions were homogenous, viscous and milky in appearance.

*Surfactant A is fatty alcohol ether sulphate, sodium salt degree of ethoxylation about 30.

**Surfactant B is disodium ethoxylated alcohol (C10-12) half ester of sulfosuccinic acid.

Preparation of Starting and Delayed Initiator

The initial initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed polymer had an average particle size of around 50 nm and had been used in the initiation step of the polymerization in order to control the particle size distribution. For the polymerization procedure, 11 g of 50 nm seed dispersion with a 33% of solid (seed polymer) content, starting initiator, and water were initially charged into the reactor. The monomer emulsion 5.1 (Emulsion 1) and half of the delayed initiator were fed parallel in two streams both having the same feeding time of 1.5 hours, using a peristaltic pump via silicone tubing. The feed rate was monitored volumetrically. The reactions were performed in a 1 liter, glass made and round-bottomed reactor flask with a mechanical agitator and stirred at 180 rpm. The reactor flask was equipped with reflux condenser, thermocouple and metallic stirrer. Polymerization temperature was maintained at 84-86° C., and agitation rate was increased if necessary. After the first feed, 34.5 g of about 50 nm seed dispersion with a 33% of solid (seed polymer) content was added into the reactor for the formation of small particles and the monomer emulsion 5.2 (Emulsion 2) and rest of the delayed initiator were fed for another 1.5 hour. After the whole feed, the monomer mix beaker was flushed with water, and was post-heated for 30 min. The reaction mixture was then cooled to 55° C. and post redox reaction was applied. A redox post polymerization process provides lower residual monomer levels and/or lower volatile organic compound levels for emulsion systems. As the redox couple t-butyl hydroperoxide/sodium salt of an organic sulfonic acid derivative were selected. In a neutralization step, ammonia solution (28%) was used to adjust the pH to approximately 7.0±0.5. Then, the polymer was filtered into a suitable container.

Characterization, Analysis and Testing

The thermal properties of the polymers were measured by differential scanning calorimeters (Mettler Toledo, DSC 821e) in a flowing air atmosphere from −80° C. at a scanning rate of 10° C./min. Solid content was measured by drying the polymer films at 150° C. for 20 minutes after filtered from 60 micron filter. Weight of polymer (w1) and dried latex (w2) has been calculated by the following equation.

$$\text{Solid \%} = w2/w1 \times 100$$

Coagulum content of polymer latex was measured after filterable solids of any runs were dried at room temperature for 24 hours. Then, coagulum content was measured by the weight of filterable solid in 1 liter of polymer dispersion. (ISO 4576)

Free monomer measurements were performed by HS-GC (Perkin Elmer, HS 40 XL, Auto System XL) with FID detector and N2 was used as carrier gas.

Viscosity was measured by Brookfield viscosimeter under room conditions by LVT 3/60 (ISO 3219).

pH of polymers was determined under room temperature according to ISO 976 by calibrated pH meter.

Surface tension of polymer dispersions has been measured by Du Nouy ring method according to ISO 1409.

Wet scrub resistance is measured according to EN ISO 11998:2006.

Hardness of the coating film has been measured using the Persoz or Konig Pendulum. Evaluation of the hardness of paints and related coatings is made in accordance with EN ISO 1522:2006. The procedure as per König is based on the measurement of the damping of a pendulum oscillating on the paint film.

Thickening response of a polymer emulsion is the thickening response achieved with the addition of same amount of thickeners to paints (coatings) formulations in which different type of polymers are added.

Blocking performance determines the ability of a paint to withstand sticking to itself after a given amount of time to dry.

Water resistance of an emulsion polymer is measured by applying the liquid polymer emulsion 200 micron on glass panel. After 7 days curing at RT, glass panels are dipped into the water. The water whitening of the polymer films are compared with standard.

The water resistance (in paper impregnation application) was measured by Cobb test.

Cellulosic paper specimen was cut in the dimensions of 13.2 cm and 14 cm and dipped in a tank filled with polymer and waited for 10 seconds of penetration. The excess of polymer on paper was squeezed through double rollers and the coating weight was adjusted by calculating the difference in weight of neat and coated paper. The coated paper was dried in an electric oven with air circulating system at 140° C. for 2 minutes. 20 g/m2 dry coating was obtained. The coated test specimen was placed in the apparatus which is used for Cobb test, 100 ml of deionized water was poured into the ring, which has 100 cm2 testing area, as rapidly as possible and waited for 45 seconds. Then the water was quickly poured from the ring and test specimen was carefully placed on a sheet with its wetted side up. The surplus water was immediately removed by moving the hand roller once back and once forward and reweighed to calculate the COBB results.

The results are summarized in the following Tables:

TABLE 1

Water whitening results

|  | Example 1 | Example 2 | Example 3 | Example 4 | Example 5 |
|---|---|---|---|---|---|
| Water Whitening Performance after 1 hour in water* | 4 | 2 | 1 | 5 | 1 |
| Water Whitening Performance after 5 hours in water* | 5 | 3 | 2 | 5 | 2 |

*5 worst (white); 3 moderate (no whitening but blurish); 1 best (no whitening)

Water whitening results of example 5 is best according to "after 1 hour" results and between moderate and best according to "after 5 hours" results.

TABLE 2

|  | Example 1 | Example 2 | Example 3 | Example 4 | Example 5 |
|---|---|---|---|---|---|
| Tensile strength (Mpa) | 4.86 | 2.00 | 6.95 | 1.85 | 3.43 |
| Elongation (%) | 621.91 | 997.45 | 879.13 | 1283.51 | 659.34 |
| Elastic modulus (MPa) | 1.88 | 1.00 | 1.56 | 0.89 | 1.74 |

TABLE 3

% 35 PVC Satin paint formulation

| Component | Weight (g) |
|---|---|
| Water | 60.1 |
| Natrosol HR 250 | 0.4 |
| NaOH | 1.0 |
| Calgon N | 0.6 |
| Dispersant K 850 | 8.0 |
| BYK 093 | 2.0 |
| Kronos 2310 | 200.0 |
| Turkcarb 75x | 75.0 |
| Water | 23.5 |
| OW 2000 | 80.0 |
| Water | 85.5 |
| Binder | 460.0 |
| Tafigel PUR 44 | 3.0 |
| BYK 093 | 1.0 |
| Total | 1000 |

TABLE 4

Thickening response

|  | Ex1 | Ex2 | Ex3 | Ex4 | Ex5 |
|---|---|---|---|---|---|
| Thickener amount | 0.45% | 0.3% | 0.45% | 0.3% | 0.3% |
| Initial Brookfield Viscosity (sp 4/20-50-100 rpm) | 5300/3100/1980 | 8950/5360/3480 | 5350/2980/1910 | 7800/4440/2980 | 11800/7080/4700 |
| Overnight Brookfield Viscosity (sp 4/20-50-100 rpm) | 6900/3940/2500 | 15100/9200/5750 | 8250/4080/2440 | 12400/7720/5000 | 13700/7960/5000 |
| Storage stability (50° C., 1 week) Brookfield viscosity (mPa · s) | 12800/7760/4800 | 18600/11100/7100 | 19500/12300/7750 | 16700/10700/6750 | 17100/10400/6450 |

Initial measurement of thickening response is the best with patent trial Example 5. Overnight and storage stability results are also one of the best with example 5 among the other trials. The combination of all measurements for thickening response shows that this property has been improved with the present invention.

TABLE 5

Application performance

|  | Ex1 | Ex2 | Ex3 | Ex4 | Ex5 |
|---|---|---|---|---|---|
| Opacity (23° C. cured) | 97.40% | 97.88% | 97.49% | 97.36% | 98.33% |
| Gloss(20°/60°/85°) | 6.1/18.6/71.5 | 9.0/35.9/82.0 | 4.8/9.7/60.8 | 7.5/30.2/72.6 | 8.8/33.7/79.6 |
| Scrub resistance ISO micron loss | 6.11 | 2.89 | 5.98 | 1.90 | 2.99 |
| Scrub resistance ISO g/m^2 loss | 8.97 | 5.30 | 8.33 | 3.53 | 4.83 |

TABLE 5-continued

| Application performance | | | | | |
|---|---|---|---|---|---|
| | Ex1 | Ex2 | Ex3 | Ex4 | Ex5 |
| Blocking at 23° C., 3,5 hours, 2 kg | 7-7 | 6-7 | 7-7 | 6-6 | 7-7 |
| Blocking at 50° C., 3.5 hours, 2 kg (10:en iyi, 1:en kötü) | 4-4 | 3-3 | 7-7 | 3-3 | 5-5 |
| L-a-b (blue pigmented) | 63.28/−15.02/−36.53 | 63.17/−15.58/−37.45 | 63.78/−15.29/−36.69 | 61.27/−15.10/−37.06 | 62.26/−15.52/−36.75 |
| 1st day Koenig Hardness (counts/seconds) | 17 c, 23 s | 10 c, 14 s | 15 c, 21 s | 11 c, 14 s | 14 c, 19 s |
| 3rd day Koenig Hardness (counts/seconds) | 19c, 26 s | 11c, 15 s | 17c, 23 s | 11c, 15 s | 15c, 21 s |

The combination of measurements for opacity, gloss, blocking resistance in Table 5 shows that the dry film performance in terms of opacity, gloss, blocking resistance are best in Ex 5. These results clearly show that the dry film performance in terms of opacity, gloss and blocking resistance are improved with the present invention.

Additionally, according to the visual comparison stain resistance is good in Ex 5, especially for tea, coffee, red wine and water stains.

Moreover, dry film of example 5 and 1 are less tacky while Example 2, 3, 4 are tacky.

The resulting polymers of Example 1 to 5 are also applied in paper impregnation. Good water resistance has been obtained with example 5 when compared with the other comparative examples.

The invention claimed is:

1. A polymodal polymer composition formed by radical emulsion polymerization of monomers from category A which forms homopolymers with Tg above 15° C. and monomers from category B which forms homopolymers with Tg below −15° C. characterized in that
the polymodal polymer composition is composed of at least two different populations of particles, said populations differing in mean particle size value by at least a factor of 2, wherein said two different populations jointly constitute at least 80% by weight of the total polymeric content within said composition and the Tg difference between the two populations being less than 20° C., wherein
(a) a population $P_2$ is constituted by at least 80% by weight of homogeneous particles containing polymer chains built of monomers $A_2$ and $B_2$ wherein the total content of said monomers $A_2$ and $B_2$ in these polymer chains is at least 80% by weight, and
(b) a population $P_1$, distinctive of $P_2$ by mean particle size value and monomer composition, of which the particles are constituted of polymer chains predominantly built of monomers $A_1$, $B_1$, and $A_2$, $B_2$ wherein
said population $P_1$ being constituted by at least 80% by weight of monomers selected from categories A and B wherein category A and category B monomers are not randomly co-polymerized, but whereby monomers $A_2$ and $B_2$ are polymerized after the monomers $A_1$ and $B_1$ are polymerized, and wherein when $A_1$ is the same as $A_2$, $B_1$ must be different than $B_2$, and wherein when $B_1$ is the same as $B_2$, $A_1$ must be different than $A_2$.

2. The polymodal polymer composition of claim 1, wherein the total amount of monomers from categories A and B are at least 80% by weight of the total monomer amount and the ratio of monomers in category A to category B is from 20% to 80% by weight and, correspondingly the ratio of monomers in category B to category A is from 20% to 80% by weight, based on the combined amount A+B.

3. The polymodal polymer composition of claim 1, further comprising one or more functional monomers containing carboxylic, sulfonic or phosphoric acid functionality, poly-unsaturated monomers, epoxy, hydroxy, amino, amido, dicarbonyl, and siloxane, and one or more surface-active components including anionic and non-ionic surfactants, water-soluble colloids and polyelectrolytes capable of stabilizing polymer particles in the aqueous medium.

4. The polymer composition of claim 1, wherein monomer $A_1$ is methyl methacrylate and when $A_2$ is not the same as $A_1$ it is styrene, and vice versa.

5. The polymer composition of claim 1, wherein monomer $B_1$ is butyl acrylate and when $B_2$ is not the same as $B_1$ it is ethyl acrylate or 2-ethylhexyl acrylate, and vice versa.

6. The polymer composition of claim 1, wherein monomers B ($B_1$ and $B_2$) are alkyl acrylates.

7. The polymer composition of claim 1, wherein $B_1$ and $B_2$ are the same monomers but $A_1$ and $A_2$ are different.

8. The polymer composition of claim 1, wherein $A_1$ and $A_2$ are the same monomers but $B_1$ and $B_2$ are different.

9. The polymer composition of claim 1, wherein the sum of populations $P_1$ and $P_2$ constitutes over 90% by weight of the polymer.

10. The polymer composition of claim 1, wherein the sum of populations $P_1$ and $P_2$ represents the entire population of particles present in the polymer composition.

11. The polymer composition of claim 1 for use as a coating, a binder in coatings, binders for nonwovens and textiles, saturants, ink formulations, leather and paper coating formulations, paper impregnations and adhesives.

12. A process for producing the polymer composition of claim 1, the process comprising the steps of:
providing a first seed polymer having an average particle size of 20 nm to 200 nm and providing a second seed polymer having an average particle size of 20 nm to 200 nm, the first seed polymer and the second seed polymer are provided separately from each other;
providing a first monomer emulsion comprising monomers $A_1$ and $B_1$, and providing a second monomer emulsion comprising monomers $A_2$ and $B_2$;
polymerizing the first monomer emulsion by radical emulsion polymerization in an aqueous polymerization medium containing the first seed polymer;

adding the second seed polymer and the second monomer emulsion to the polymerization medium; and polymerizing the second monomer emulsion, so as to produce particles of populations $P_1$ and $P_2$, wherein $A_1$ and $A_2$ are of category A which forms homopolymers with Tg above 15° C., and wherein $B_1$ and $B_2$ are of category B which forms homopolymers with Tg below −15° C.

13. The process of claim 12, wherein monomers $A_1$ and $B_1$ are polymerized by at least 90% before monomers $A_2$ and $B_2$ are added to the polymerization medium.

14. The process of claim 12, further comprising a redox post polymerization treatment to reduce the level of residual monomer below 1%.

15. The polymer composition of claim 1, wherein monomers $B_1$ and $B_2$ differ by at least 2 carbon atoms.

* * * * *